Jan. 1, 1924
M. C. MAXWELL
FACING RING STRUCTURE FOR CYLINDER LOCKS
Filed Oct. 30, 1922
1,479,726
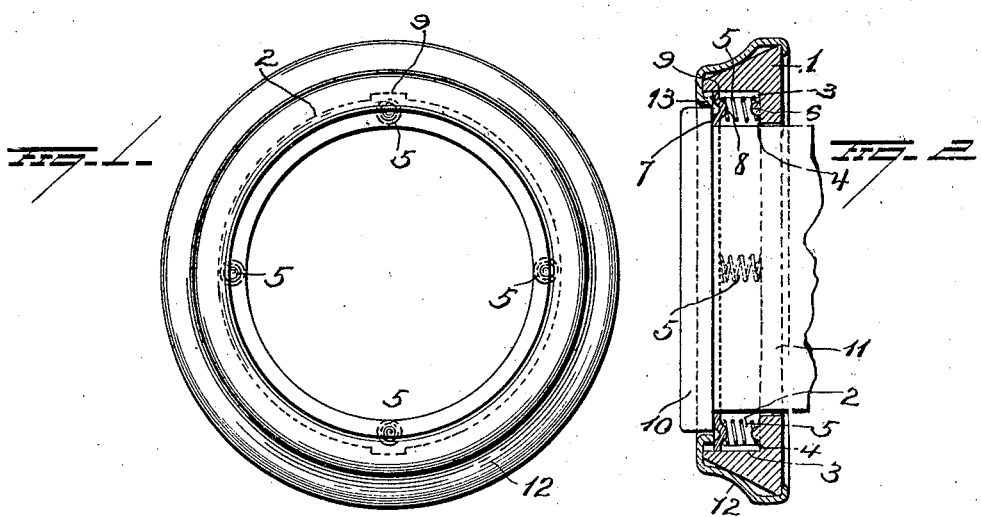
Inventor
M. C. Maxwell
By Seymour & Bright
Attorneys Patented Jan. 1, 1924.

1,479,726

UNITED STATES PATENT OFFICE.

MAXWELL C. MAXWELL, OF STAMFORD, CONNECTICUT, ASSIGNOR TO THE YALE & TOWNE MANUFACTURING COMPANY, OF STAMFORD, CONNECTICUT.

FACING-RING STRUCTURE FOR CYLINDER LOCKS.

Application filed October 30, 1922. Serial No. 597,927.

*To all whom it may concern:*

Be it known that I, MAXWELL C. MAXWELL, a citizen of the United States, and a resident of Stamford, in the county of Fairfield and State of Connecticut, have invented certain new and useful Improvements in Facing-Ring Structures for Cylinder Locks; and I do hereby declare the following to be a full, clear, and exact description of the invention, such as will enable others skilled in the art to which it appertains to make and use the same.

This invention relates to improvements in facing or rose ring structures,—one object of the invention being to provide a substantial facing ring which will resist penetration by a boring tool and which will have associated therewith simple and efficient means to insure proper close connection between the headed end of a lock cylinder and said facing ring regardless of the exact adjustment of the cylinder in its connection with a door.

With this and other objects in view, the invention consists in certain novel features of construction as hereinafter set forth and pointed out in the claims.

In the accompanying drawings,—

Figure 1 is a front view of a facing ring structure embodying my improvements, and Figure 2 is a sectional view of the same, and showing the application of the device to a lock cylinder, the latter being represented in elevation.

In the drawings, the facing ring is represented at 1 and will preferably be composed of steel or hardened metal which will resist penetration by a boring tool. The ring 1 is made with an internal annular recess 2, the wall of which is provided at intervals with straight slots 3 for a purpose hereinafter explained. The bottom of the annular recess 2 provides a shoulder 4 against which the inner end of a plurality of spiral springs 5 may be seated and said shoulder 4 is also provided with teats 6 to enter said spiral springs. A ring 7 bears against the outer ends of said spiral springs and is provided with teats 8 to enter the latter. The ring 7 is provided near the several teats 8 with outwardly projecting lugs 9 which enter the straight grooves 3 to retain said ring in proper relation to the springs and to guide said ring when pressure is applied thereto.

The ring 7 constitutes an abutment for the flanged or headed end 10 of a cylinder lock 11 and the springs 5 will afford such resilience as to insure proper close connection of the cylinder head with the facing ring regardless of the exact adjustment of the cylinder in the opening in a door.

The facing ring 1 is covered by a scalp 12 preferably of a metal differing from that of the ring 1 and an inwardly projecting portion 13 of said scalp provides an abutment to prevent displacement of the spring-pressed ring 7.

Having fully described my invention what I claim as new and desire to secure by Letters-Patent is:

1. In a structure of the character described, the combination of an internally recessed facing ring, a plurality of coiled springs seated in the recessed portion of said ring, and a ring to receive a cylinder head, bearing against the outer ends of said coiled springs.

2. In a structure of the character described, the combination of an internally recessed facing ring, a plurality of coiled springs located in the recessed portion of said ring, a ring bearing against the outer ends of said springs, and a scalp covering said facing ring and having a part constituting an abutment for the ring at the outer ends of said springs.

3. In a structure of the character described, the combination of an internally recessed facing ring, teats in the recessed portion of said ring, the wall of said recessed portion having straight grooves, springs receiving said teats at one end, and a ring having teats entering the other ends of said springs, said ring having lugs entering said straight grooves.

In testimony whereof, I have signed this specification in the presence of two subscribing witnesses.

MAXWELL C. MAXWELL.

Witnesses:
JOSEPH C. PETERICK,
CHARLES A. BERRY.